(12) United States Patent
Kim

(10) Patent No.: US 11,712,740 B2
(45) Date of Patent: Aug. 1, 2023

(54) BUILT-IN TYPE SUPERSONIC SPINDLE AND EXCITATION METHOD USING SAME

(71) Applicant: KASWIN CO., LTD., Changwon-si (KR)

(72) Inventor: Gi Soo Kim, Changwon-si (KR)

(73) Assignee: KASWIN CO., LTD., Changwon-si (KR)

( * ) Notice: Subject to any disclaimer, the term of this patent is extended or adjusted under 35 U.S.C. 154(b) by 241 days.

(21) Appl. No.: 17/151,214

(22) Filed: Jan. 18, 2021

(65) Prior Publication Data

US 2022/0212270 A1 Jul. 7, 2022

(30) Foreign Application Priority Data

Jan. 7, 2021 (KR) .................. 10-2021-0001808

(51) Int. Cl.
*B23B 37/00* (2006.01)
*B23B 29/12* (2006.01)

(52) U.S. Cl.
CPC ............ *B23B 37/00* (2013.01); *B23B 29/125* (2013.01); *B23B 2270/10* (2013.01); *B23B 2270/38* (2013.01); *Y10T 408/675* (2015.01)

(58) Field of Classification Search
CPC ... B23B 37/00; B23B 29/125; B23B 2270/10; B23B 2270/38; Y10T 408/675
See application file for complete search history.

(56) References Cited

FOREIGN PATENT DOCUMENTS

| DE | 10308442 B3 | * | 7/2004 | ....... B23B 29/03432 |
|---|---|---|---|---|
| JP | 10-249684 A | | 9/1998 | |
| JP | 10249684 A | * | 9/1998 | |
| KR | 20-1999-003869 U | | 1/1999 | |
| KR | 10-0676854 B1 | | 2/2007 | |
| KR | 100676854 B1 | * | 2/2007 | |
| KR | 10-2013-0083758 A | | 7/2013 | |
| KR | 101336524 B1 | * | 12/2013 | |
| KR | 10-1904799 B1 | | 11/2018 | |
| KR | 10-2157402 B1 | | 9/2020 | |
| KR | 10-2186473 B1 | | 12/2020 | |

* cited by examiner

*Primary Examiner* — Eric A. Gates
*Assistant Examiner* — Reinaldo A Vargas Del Rio
(74) *Attorney, Agent, or Firm* — Revolution IP, PLLC

(57) ABSTRACT

The present invention relates to a built-in type spindle, and more particularly, to a built-in type supersonic spindle, which includes a housing having a built-in spindle unit therein and a supersonic vibrator pressing the built-in spindle unit in order to enhance machining accuracy and reduce a damage of a bearing by vibrating a spindle and the bearing at the same time, and an excitation method using the built-in type supersonic spindle.

10 Claims, 5 Drawing Sheets

BUILT-IN TYPE SUPERSONIC SPINDLE AND EXCITATION METHOD USING SAME

BACKGROUND OF THE INVENTION

Field of the Invention

The present invention relates to a built-in type spindle, and more particularly, to a built-in type supersonic spindle, which includes a housing having a built-in spindle unit therein and a supersonic vibrator pressing the built-in spindle unit in order to enhance machining accuracy and reduce a damage of a bearing by vibrating a spindle and the bearing at the same time, and an excitation method using the built-in type supersonic spindle.

Background Art

In general, a machine tool has a spindle mounted to rotate the tool, and a built-in type spindle has means for generating rotary power in order to rotate a main shaft of the spindle.

Such a built-in type spindle is reduced in the whole volume since having the means for generating rotary power mounted therein, and improves machining accuracy since the rotary power generating means directly rotates the main shaft.

Meanwhile, recently, supersonic machining methods for performing machining by vibrating the spindle using an excitation part have been proposed. Such supersonic machining methods reduce machining period and expand the lifespan of tools.

As shown in FIG. 1, a spindle 13 is rotated by a motor 11, and is supported by a bearing 14. In this instance, a supersonic vibrator 16 is disposed at one side of the spindle 13 to generate vibration, and the generated vibration is transmitted to a machining tool holder 4 through a support horn 17. The machining tool 3 disposed on the machining tool holder 4 receives rotary power and vibration at the same time. (refer to Korean Patent No. 10-1904799)

However, such a conventional art has a disadvantage in that vibration is transmitted to the bearing 14, which is in a stationary state, since only the spindle 13 is vibrated and rotated, thus it causes a damage of the bearing and deteriorates machining accuracy.

Meanwhile, because the built-in type spindle and the supersonic spindle have been known widely and are described in the following conventional art literature in detail, descriptions and drawings of them will be omitted.

PATENT LITERATURE

Patent Documents

Korean Patent No. 10-2157402
Korean Patent No. 10-2186473
Korean Patent No. 10-1904799
Korean Utility Model Publication No. 20-1999-003869

SUMMARY OF THE INVENTION

Accordingly, the present invention has been made to solve the above-mentioned problems occurring in the prior arts, and it is an object of the present invention to provide a built-in type supersonic spindle, which includes a main case in which a built-in spindle unit is embedded, and an interworking bar disposed in the main case to transmit vibration to the built-in spindle unit in order to enhance machining accuracy and reduce a damage of a bearing by vibrating the main case and the built-in spindle at the same time, and an excitation method using the built-in type supersonic spindle.

Objects of the present invention are not limited to the objects described above, and other objects that are not described will be clearly understood by a person skilled in the art from the description below.

To accomplish the above object, according to the present invention, there is provided a built-in type supersonic spindle including: a housing in which a supersonic vibrator is disposed at one side; and a built-in spindle unit disposed inside the housing, wherein the supersonic vibrator gets in contact with the built-in spindle unit in order to transmit vibration generated from the supersonic vibrator to the built-in spindle unit, and a spindle of the built-in spindle unit is vibrated together with a bearing, and is supported by the bearing to be rotatable.

Moreover, the housing includes: a housing body; a first opening part formed at one side of the housing body to expose a portion of the supersonic vibrator to the outside; and a second opening part formed at the other side of the housing body to expose a portion of the spindle so that a machining too is combined with the second opening part, and the built-in spindle unit includes a spindle case in which the spindle and the bearing are accommodated.

Furthermore, the built-in type supersonic spindle further includes a magnetic levitation unit disposed between the housing and the built-in spindle unit to make the built-in spindle unit float inside the housing.

Additionally, the magnetic levitation unit includes an axially magnetic levitation unit and a radially magnetic levitation unit, the axially magnetic levitation unit is arranged in an axial direction of the spindle between the housing and the built-in spindle unit, and the radially magnetic levitation unit is arranged in a radial direction of the spindle between the housing and the built-in spindle unit. The built-in spindle unit is spaced apart in the axial direction and in the radial direction inside the housing at predetermined intervals.

In addition, the axially magnetic levitation unit includes: a first axially magnetic levitation unit arranged between the side of the spindle case, which directs the supersonic vibrator, and the inner surface of the housing opposed to the side; and a second axially magnetic levitation unit arranged between the side of the spindle case, which directs the machining tool, and the inner surface of the housing opposed to the side of the spindle case, which directs the machining tool.

Moreover, the radially magnetic levitation unit is arranged between the inner face of the housing in the radial direction and the outer surface of the spindle case in the radial direction.

Furthermore, the magnetic levitation units are disposed in a pair, and the housing and the spindle case keep an interval therebetween by a mutually exclusive force using electromagnets having the same polarity.

Additionally, the built-in spindle unit includes a preload adjusting part disposed between the spindle and the spindle case to adjust preload of the bearing, and the preload adjusting part includes: a support part mounted on the inner surface of the spindle case; a contact part disposed between the bearing and the support part and getting in contact with an outer wheel of the bearing; and an elastic pressurizing part disposed at one side of the support part to pressurize the contact part.

In addition, the support part includes: a support part body, which is fixed on the inner surface of the spindle case, and of which one end is bent at a specific angle; and an insertion groove recessed at the bent portion of the support part body so that one end of the elastic pressurizing part is inserted into the insertion groove.

Moreover, the contact part includes: a bar-shaped first contact part body; and a second contact part body extending in the direction of the support part from the first contact part, and the second contact part body increases in thickness in the central direction of the spindle case so as to be thicker than the first contact part body. The side of the second contact part body in the direction of the support part gets in contact with the bent portion of the support part body, and the contact part includes an insertion groove formed at a recessed portion thereof so that the other end of the elastic pressurizing part is inserted thereinto, and a protrusion part protrudes on the side of the second contact part body in the opposite direction of the support part to pressurize the outer wheel of the bearing.

In another aspect of the present invention, the present invention provides an excitation method using the supersonic spindle includes the steps of: vibrating the built-in spindle unit by the supersonic vibrator, so that the spindle and the bearing of the built-in spindle unit are vibrated at the same time; rotating the spindle by the driving part of the built-in spindle unit; and vibrating and rotating the machining tool disposed on the spindle at the same time, so that a workpiece is machined.

Furthermore, the built-in spindle unit floats inside the housing by the magnetic levitation unit.

The above and other objects, features and advantages of the present invention will be more clearly understood from the following detailed description taken in conjunction with the accompanying drawings.

The terms and words used in the specification and claims must not be limited to typical or dictionary meanings, but must be regarded as concepts selected by the inventor as concepts which best illustrate the present invention, and must be interpreted as having meanings and concepts adapted to the scope and spirit of the present invention to aid in understanding the technology of the present invention.

The built-in type supersonic spindle and the excitation method using the same according to the present invention can prevent a damage of the bearing caused by excitation and enhance machining accuracy.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
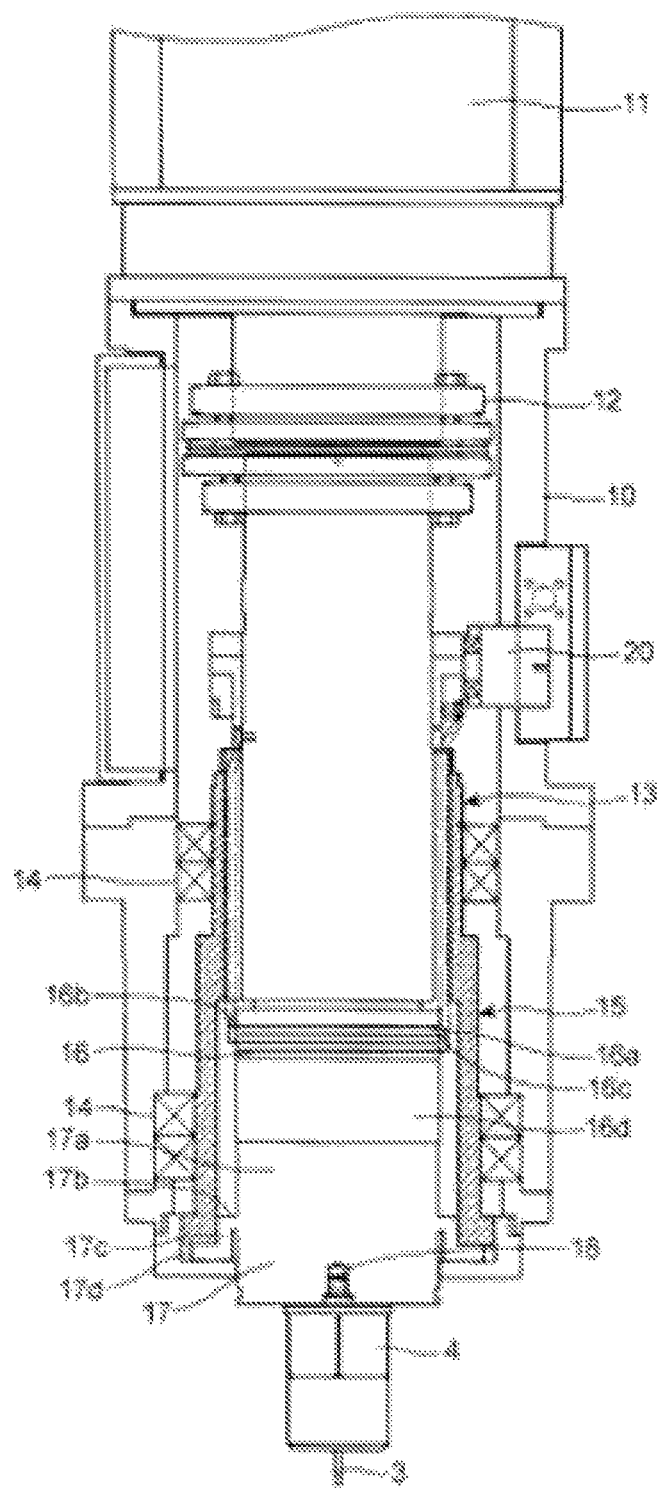
FIG. 1 is a schematic diagram of a general supersonic spindle.

Hereinafter, an embodiment of the present invention will be described in detail with reference to the accompanying drawings. In the drawings, thicknesses of lines and sizes of constituent elements may be exaggerated for clarity and convenience in explanation.

Further, wordings to be described later are defined in consideration of the functions of the present invention, and may differ depending on the intentions of a user or an operator or custom. Accordingly, such wordings should be defined on the basis of the contents of the overall specification.

In addition, the embodiment disclosed hereinafter does not limit the scope of the present invention, but corresponds to merely exemplary terms of constituent elements presented in claims of the present invention, and the embodiments that include replaceable constituent elements as equivalents of the constituent elements defined in the overall specification and claims may be included in the scope of the present invention.

As shown in FIGS. 2 to 5, the built-in type supersonic spindle according to an embodiment of the present invention includes: a housing 100 in which a supersonic vibrator 300 is disposed at one side; and a built-in spindle unit 200 disposed inside the housing 100. In this instance, the supersonic vibrator 300 gets in contact with the built-in spindle unit 200 in order to transmit vibration generated from the supersonic vibrator 300 to the built-in spindle unit 200. That is, because the built-in spindle unit 200 is vibrated, a spindle 210 of the built-in spindle unit 200 is also vibrated together with a bearing 240. In the above state, the spindle 210 is supported by the bearing 240 to be rotatable.

As widely known, the built-in spindle unit 200 adopts the method that the spindle 210 buried therein is driven by a driving part 220. The driving part 220 includes a stator 221 and a rotor 222, and the rotor 222 is rotated by an action with the stator 221. In this instance, because the rotor 222 interworks with the spindle 210, the spindle 210 is rotated in interworking with rotation of the rotor 222. Moreover, the spindle 210 and the driving part 220 are accommodated in the spindle case 230, and such a built-in spindle unit has been known widely. Especially, because such a built-in spindle unit is described in Korean Utility Model Registration No. 20-0215503 in detail, detailed description and drawings thereof will be omitted.

Figure 2:
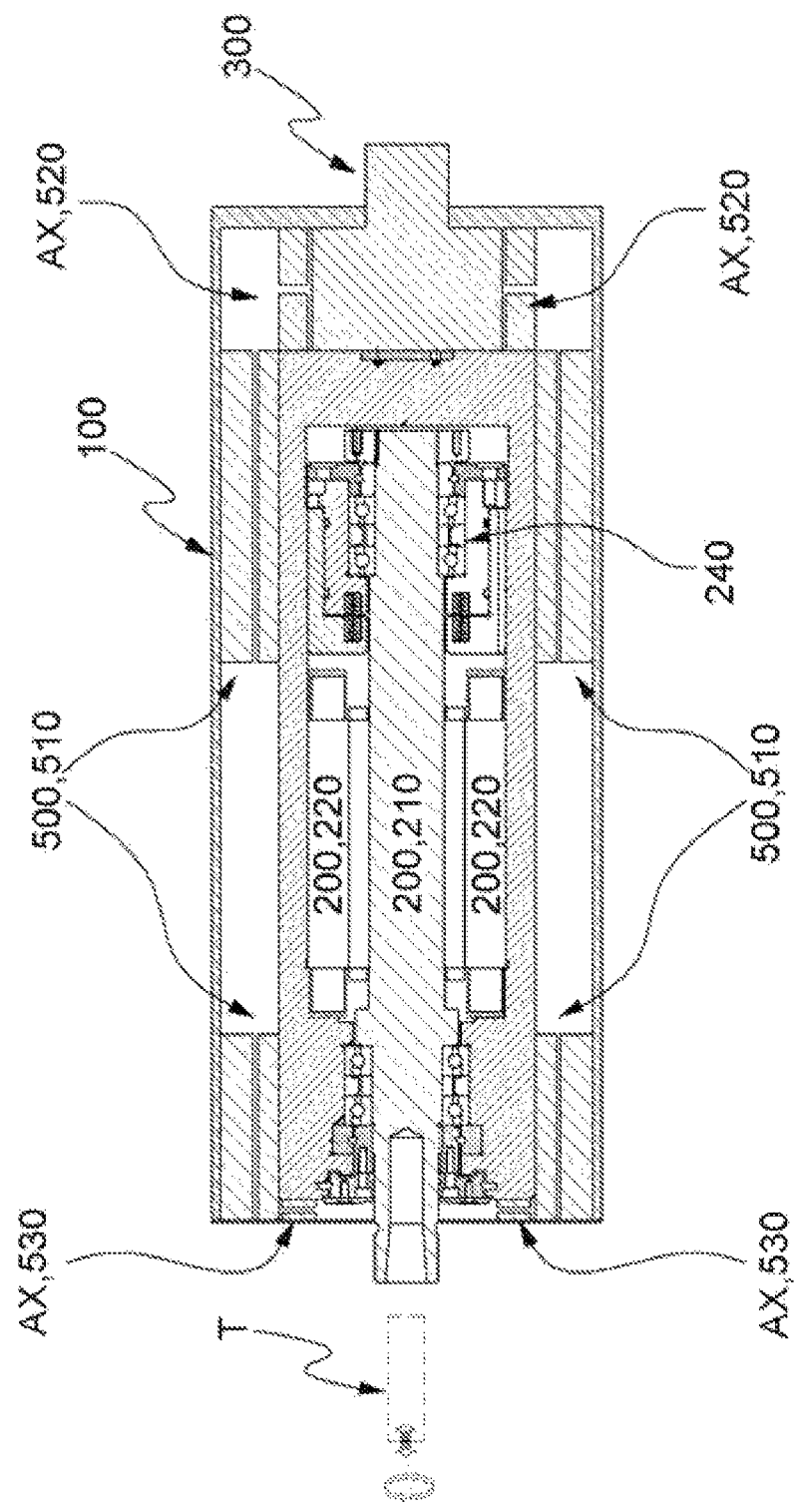
FIG. 2 is a schematic diagram of a supersonic spindle according to an embodiment of the present invention.

As described above, the vibration generated from the supersonic vibrator 300 is transmitted to the built-in spindle unit 200, so the built-in spindle unit 200 is vibrated. That is, the spindle 210 of the built-in spindle unit 200 is vibrated together with the bearing 240. Therefore, the spindle 210 and the bearing 240 do not generated relative motion in an excitation direction. For instance, as shown in FIG. 2, if the built-in spindle unit 100 is vibrated in a direction 1, the spindle 210 and the bearing 240 are all vibrated in the direction 1. Therefore, the spindle 210 and the bearing 240 do not generate relative motion in the direction 1. In the above state, the spindle 210 gets in contact with the bearing 240 and is rotated.

According to the conventional arts, because only the spindle 13 is vibrated and the bearing 14 keeps the stationary state, vibration transmitted to the spindle 13 is transmitted to the bearing 14 and it causes a damage of the bearing 14 (see FIG. 1).

In order to solve the above problem of the conventional arts, because the entire built-in spindle unit 200 is vibrated by the supersonic rotator, the spindle 210 and the bearing 240 are vibrated together. Therefore, differently from the conventional arts, the present invention can prevent a damage of the bearing since vibration is not transmitted from the spindle 210 to the bearing 240.

In the meantime, the housing 100 of the present invention accommodates the supersonic vibrator 300 and the built-in spindle unit 200 therein. For this, the housing 100 includes: a housing body 110; a first opening part 120 formed at one side of the housing body 110 to expose a portion of the supersonic vibrator 300 to the outside; and a second opening part 130 formed at the other side of the housing body 110 to expose a portion of the spindle 210 so that a machining too T is combined with the second opening part 130.

Figure 3:
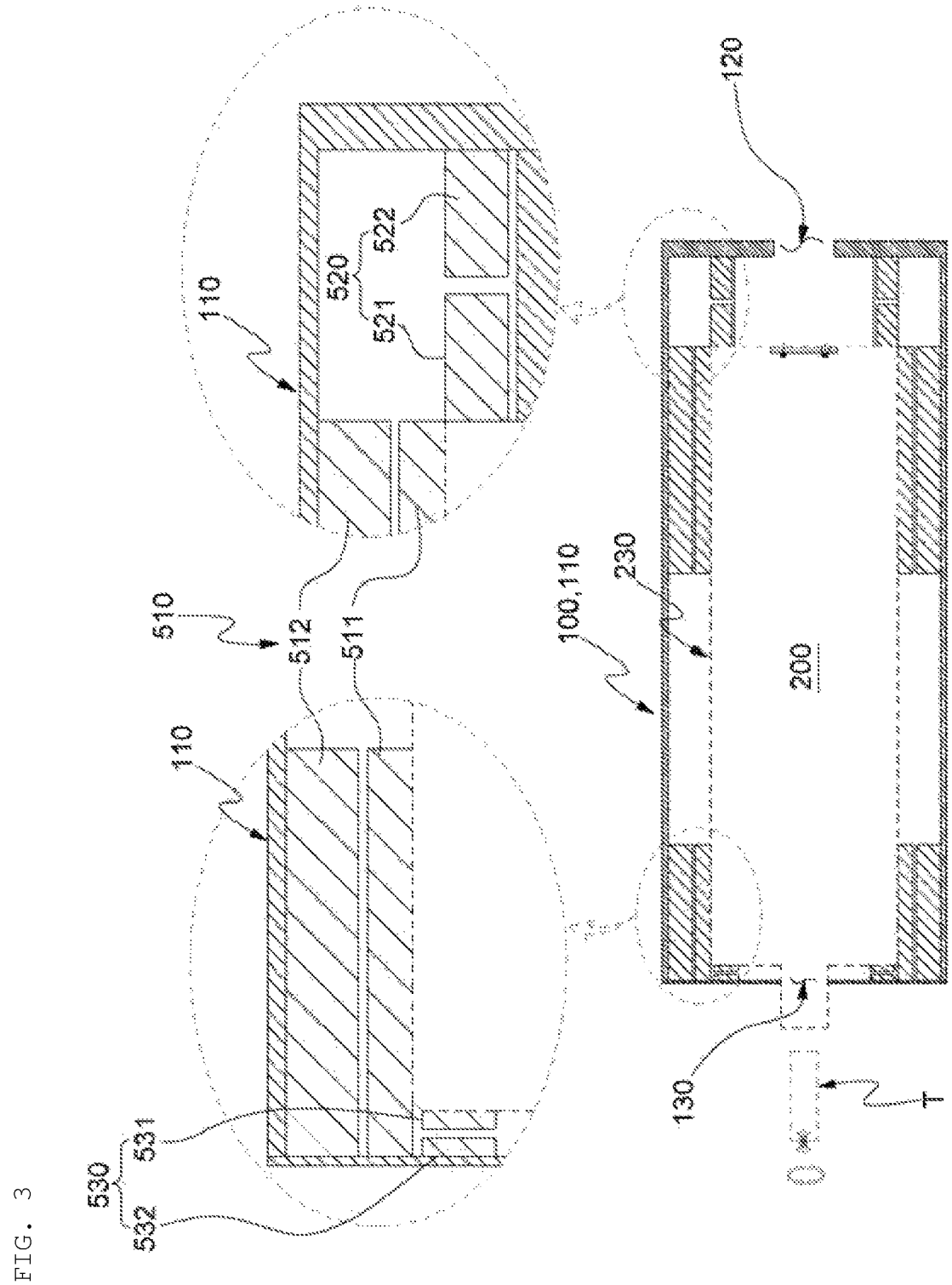
FIG. 3 is a schematic diagram and a partially enlarged view showing a housing and a magnetic levitation unit except a built-in spindle unit as the supersonic spindle according to the embodiment of the present invention.

Referring to FIG. 3, the housing body 110 is formed in a cylindrical shape, and is empty. In the right direction of the drawing, the housing body 110 has the first opening part 120. Furthermore, in the left direction of the drawing, the housing body 110 has the second opening part 130. The supersonic vibrator 300 may be mounted through the first opening part 120. As shown in FIG. 1, the supersonic vibrator 300 includes: a supersonic vibrator body 310 for generating vibration; and a supply terminal 320 disposed on the supersonic vibrator body 310 to receive electric power from the outside. Such a supply terminal 320 is exposed to the outside through the first opening part 120 to receive electric power. The supersonic vibrator body 310 repeats expansion and contraction according to power supply using a piezo element, and the detailed description and drawing thereof will be omitted since the above-mentioned technology has been known widely. The supersonic vibrator body 310 gets in contact with the built-in spindle unit 200 to transmit vibration.

As described above, because the built-in spindle unit 200 receives vibration from the supersonic vibrator 300, it is necessary to maintain an interval between the built-in spindle unit 200 and the housing 100. For this, a magnetic levitation unit 500 is disposed between the housing 100 and the built-in spindle unit 200.

Additionally, the built-in spindle unit 200 includes a spindle case 230 in which the spindle 210 and the bearing 240 are disposed.

The magnetic levitation unit 500 includes an axially magnetic levitation unit AX and a radially magnetic levitation unit 510. The axially magnetic levitation unit AX is arranged in an axial direction of the spindle 210 between the housing 100 and the built-in spindle unit 200, and the radially magnetic levitation unit 510 is arranged in a radial direction of the spindle 210 between the housing 100 and the built-in spindle unit 200. That is, the built-in spindle unit 200 can keep a state where it is spaced apart in the axial direction inside the housing 100 at a predetermined interval by the axially magnetic levitation unit AX. Moreover, the built-in spindle unit 200 is spaced apart in the radial direction inside the housing 100 at a predetermined interval by the radially magnetic levitation unit 510. In other words, the built-in spindle unit 200 floats inside the housing 100 and is spaced apart in the axial and radial directions at the predetermined intervals by the magnetic levitation unit 500 so as to prevent mutual collision and to realize stable machining.

As shown in FIGS. 2 and 3, the radially magnetic levitation unit 510 is arranged between the inner surface of the housing 100 in the radial direction and the outer surface of the spindle case 230 in the radial direction. That is, the radial direction distance between the housing 100 and the built-in spindle unit 200 is kept constantly by the radially magnetic levitation unit 510, and so, it prevent crash between the built-in spindle unit 200 and the housing 100. The radially magnetic levitation unit 510 includes a first-first magnetic levitation unit 511 attached to the outer surface of the spindle case 230 in the radial direction; and a first-second magnetic levitation unit 512 attached to the inner surface of the housing 100. The first-first magnetic levitation unit 511 and the first-second magnetic levitation unit 512 keep an interval between the housing 100 and the spindle case 230 by a mutually exclusive force using electromagnets having the same polarity. Because the same applies to a second axially magnetic levitation unit 520, which will be described later, hereinafter, repeated description will be omitted. Meanwhile, as shown in the drawings, a plurality of the radially magnetic levitation units 510 are disposed in a lateral direction in the drawings.

The axially magnetic levitation unit AX includes: a first axially magnetic levitation unit 520 arranged between the side of the spindle case 230, which directs the supersonic vibrator 300, and the inner surface of the housing 100 opposed to the side; and a second axially magnetic levitation unit 530 arranged between the side of the spindle case 230, which directs the machining tool T, and the inner surface of the housing 100 opposed to the side of the spindle case 230, which directs the machining tool T. The built-in spindle unit 200 can keep the state where it is spaced apart in the axial direction inside the housing 100.

In the meantime, a pair of the first axially magnetic levitation units 520 are arranged between the side of the spindle case 230, which directs the supersonic vibrator 300, and the inner surface of the housing 100 opposed to the side. As shown in FIGS. 2 and 3, a pair of the first axially magnetic levitation units 520 are arranged between the direction of the supersonic vibrator 300, namely, the right side of the spindle case 230 of the built-in spindle unit 200 in the drawings, and the inner surface of the housing 100 opposed to the right side. The first axially magnetic levitation unit 520 includes: a second-first magnetic levitation unit 521 arranged on the right side of the spindle case 230 in the drawings; and a second-second magnetic levitation unit 522 attached to the inner surface of the housing 100. Therefore, the spindle case 230 and the housing 100 can be spaced apart from each other by a repulsive force generated between the second-first magnetic levitation unit 521 and the second-second magnetic levitation unit 522.

a pair of the second axially magnetic levitation units 530 are arranged between the side of the spindle case 230, which directs the machining tool T, and the inner surface of the housing 100 opposed to the side. As shown in FIGS. 2 and 3, a pair of the second axially magnetic levitation units 530 are arranged between the direction of the machining tool T, namely, the left side of the spindle case 230 of the built-in spindle unit 200 in the drawings, and the inner surface of the housing 100 opposed to the left side. The second axially magnetic levitation unit 530 includes: a third-first magnetic levitation unit 531 arranged on the left side of the spindle case 230 in the drawings; and a third-second magnetic levitation unit 532 attached to the inner surface of the housing 100. Therefore, the spindle case 230 and the housing 100 can be spaced apart from each other by a repulsive force generated between the third-first magnetic levitation unit 531 and the third-second magnetic levitation unit 532.

As described above, the magnetic levitation units 500 according to the present invention are disposed in the radial directions and the right and left sides of the housing 100 and the spindle case 230, so that the spindle case 230 maintains an interval from the housing 100.

Figure 4:
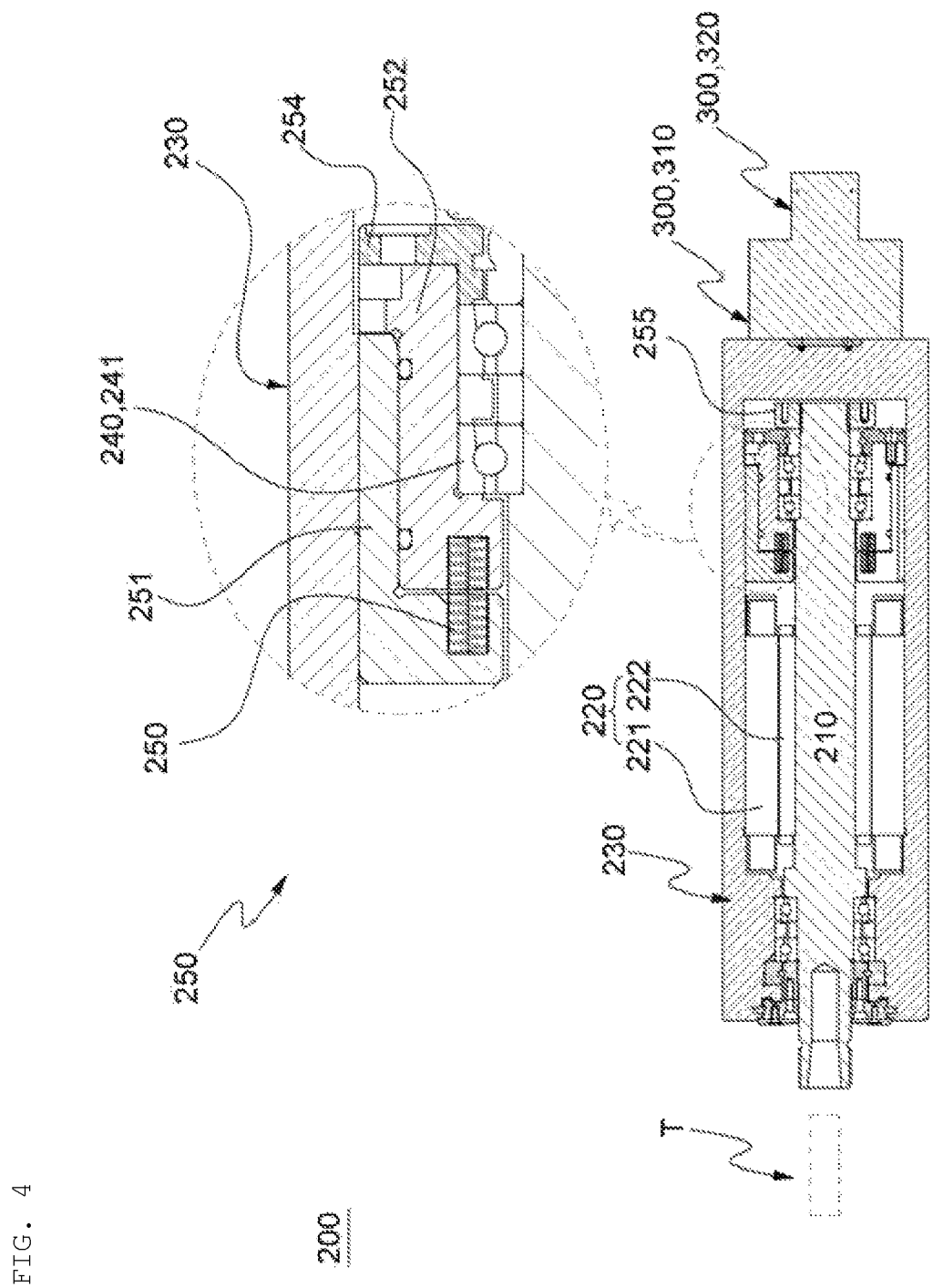
FIGS. 4 and 5 are a partially enlarged view and an exploded view of a preload control part of the supersonic spindle according to the embodiment of the present invention.
Figure 5:
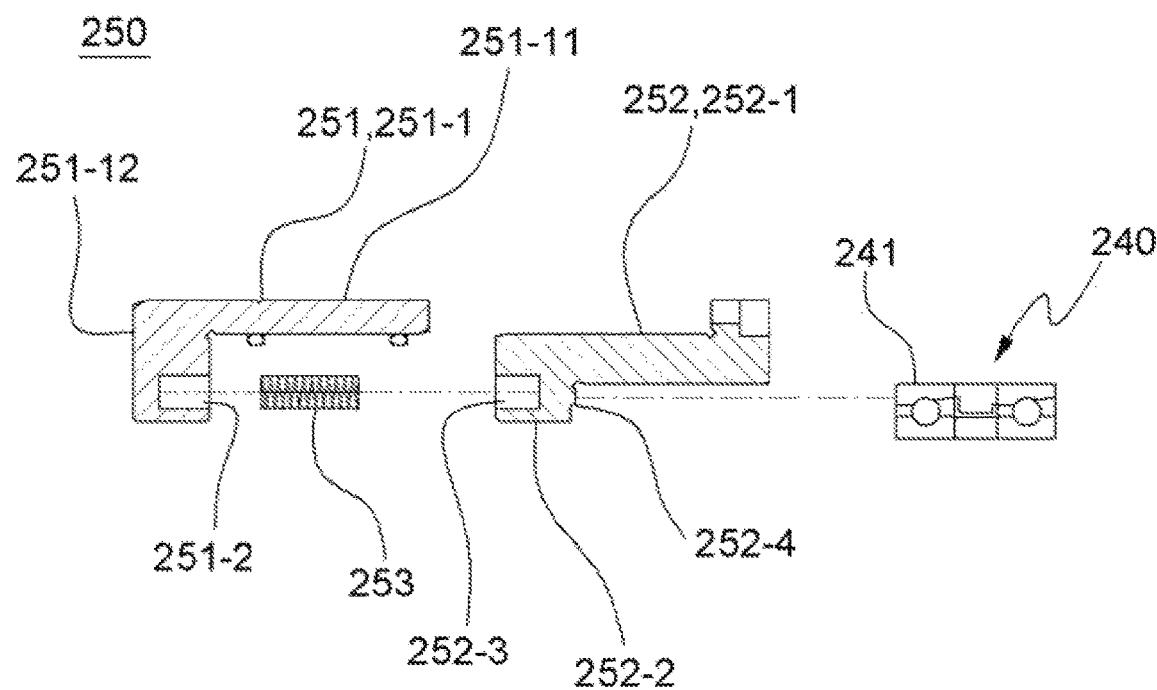

As described above, the spindle 230 is supported by the bearing 240, and it is necessary to adjust preload acting to the bearing 240 for silent driving even though there is a change in rotational speed of the spindle 230. For this, the built-in spindle unit 200 according to the present invention includes a preload adjusting part 250 disposed between the spindle 210 and the spindle case 230 to adjust preload of the bearing 240. As shown in FIGS. 4 and 5, the preload adjusting part 250 includes: a support part 251 mounted on the inner surface of the spindle case 230; a contact part 252 disposed between the bearing 240 and the support part 251 and getting in contact with an outer wheel 241 of the bearing 240; and an elastic pressurizing part 253 disposed at one side of the support part 251 to pressurize the contact part 252. That is, the support part 251 is fixed to the inner surface of the spindle case 230. The outer wheel 241 of the bearing 240 is pressurized by the contact part 252, and the contact part 252 is supported by the support part 251.

Such a support part 251 includes: a support part body 251-1, which is fixed on the inner surface of the spindle case 230, and of which one end is bent at a specific angle; and an insertion groove 251-2 recessed at the bent portion of the support part body 251 so that one end of the elastic pressurizing part 253 (left end in the drawing) is inserted into the insertion groove 251-2. As shown in FIGS. 4 and 5, the support part body 251-1 includes: a horizontal support part 251-11 arranged in a horizontal direction and fixed to the inner surface of the spindle case 230; and a vertical support part 251-12 bent at one end of the horizontal support part 251-11 and extending in the direction of the spindle 210. In this instance, the insertion groove 251-2 may be formed on the side of the vertical support part 251-12 in the direction of the contact part 252.

The contact part 252 includes: a bar-shaped first contact part body 252-1; and a second contact part body 252-2 extending in the direction of the support part 251 from the first contact part 252-1. That is, the second contact part body 252-2 extends in the direction of the support part 251 from the first contact part body 252-1, namely, in the left direction in the drawing. Such a second contact part body 252-2 increases in thickness in the central direction of the spindle case 230 so as to be thicker than the first contact part body 252-1, and protrudes in the central direction of the spindle case 230. In this instance, the side of the second contact part body 252-2 in the direction of the support part 251, namely, the side in the left direction in the drawing, gets in contact with the bent portion, namely, the vertical support part 251-12, of the support part body 251, and the contact part 252 includes an insertion groove 252-3 formed at a recessed portion thereof so that the other end (right end in the drawing) of the elastic pressurizing part 253 is inserted thereinto. Moreover, the contact part 252 further includes a protrusion part 252-4 protruding on the side of the second contact part body 252-2 in the opposite direction of the support part 251 (right side in the drawing), and the protrusion part 252-4 pressurizes the outer wheel 241 of the bearing 240 to adjust preload.

That is, the contact part 252 is supported by the support part 251 to be pressurized first, and then, is second pressurized by the elastic pressurizing part 253. In this instance, the elastic pressurizing part 253 may use a coil spring, which is known widely. The elastic pressurizing part 253 is transformed elastically to adjust pressure of the contact part 252. Therefore, the contact part 252 can adjust the power to pressurize the outer wheel 241. In the meantime, the side of the contact part 252 in the opposite direction of the support part 251 may be supported by a support plate 254 and a base 255.

Hereinafter, referring to FIGS. 2 to 5, a machining method using the supersonic spindle will be described.

First, the supersonic vibrator 300 vibrates the built-in spindle unit 200, so that the spindle 210 and the bearing 240 of the built-in spindle unit 200 are vibrated at the same time.

As described, because the supersonic vibrator 300 pressurizes the spindle case 230 of the built-in spindle unit 200, the entire built-in spindle unit 200 is vibrated so that the spindle 210 and the bearing 240 are vibrated at the same time.

In other words, because the spindle 210 and the bearing 240 are vibrated at the same time, differently from the conventional arts, there is no damage in the bearing. In the above state, the spindle 210 is rotated by the driving part 220 of the built-in spindle unit 200, so the machining tool T disposed on the spindle 210 is simultaneously vibrated and rotated, so that a workpiece is machined.

The built-in type supersonic spindle and the excitation method using the same according to the present invention can prevent a damage of the bearing caused by excitation and enhance machining accuracy.

Although exemplary embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A built-in type supersonic spindle comprising:
   a housing in which a supersonic vibrator is disposed at one side; and
   a built-in spindle unit disposed inside the housing; and
   a magnetic levitation unit disposed between the housing and the built-in spindle unit to make the built-in spindle unit float inside the housing,
   wherein the supersonic vibrator gets in contact with the built-in spindle unit in order to transmit vibration generated from the supersonic vibrator to the built-in spindle unit,
   wherein a spindle of the built-in spindle unit is vibrated together with a bearing, and is supported by the bearing to be rotatable, and
   wherein the magnetic levitation units are disposed in a pair, and the housing and a spindle case keep an interval therebetween by a mutually exclusive force using electromagnets having the same polarity.

2. The built-in type supersonic spindle according to claim 1, wherein the housing includes:
   a housing body;
   a first opening part formed at one side of the housing body to expose a portion of the supersonic vibrator to the outside; and
   a second opening part formed at the other side of the housing body to expose a portion of the spindle so that a machining tool is combined with the second opening part, and
   wherein the built-in spindle unit includes the spindle case in which the spindle and the bearing area accommodated.

3. The built-in type supersonic spindle according to claim 1, wherein the magnetic levitation unit includes an axially magnetic levitation unit and a radially magnetic levitation unit,
   wherein the axially magnetic levitation unit is arranged in an axial direction of the spindle between the housing and the built-in spindle unit, and the radially magnetic levitation unit is arranged in a radial direction of the spindle between the housing and the built-in spindle unit, and wherein the built-in spindle unit is spaced apart in the axial direction and in the radial direction inside the housing at predetermined intervals.

4. The built-in type supersonic spindle according to claim 3, wherein the axially magnetic levitation unit includes:
   a first axially magnetic levitation unit arranged between the side of the spindle case, which directs the supersonic vibrator, and the inner surface of the housing opposed to the side; and
   a second axially magnetic levitation unit arranged between the side of the spindle case, which directs a machining tool, and the inner surface of the housing opposed to the side of the spindle case, which directs the machining tool.

5. The built-in type supersonic spindle according to claim 3, wherein the radially magnetic levitation unit is arranged between the inner face surface of the housing in the radial direction and the outer surface of the spindle case in the radial direction.

6. The built-in type supersonic spindle according to claim 1, wherein the built-in spindle unit includes a preload adjusting part disposed between the spindle and the spindle case to adjust preload of the bearing, and
   wherein the preload adjusting part includes: a support part mounted on the inner surface of the spindle case; a contact part disposed between the bearing and the support part and getting in contact with an outer wheel of the bearing; and an elastic pressurizing part disposed at one side of the support part to pressurize the contact part.

7. The built-in type supersonic spindle according to claim 6, wherein the support part includes:
   a support part body, which is fixed on the inner surface of the spindle case, and of which one end is bent at a specific angle; and
   an insertion groove recessed at the bent portion of the support part body so that one end of the elastic pressurizing part is inserted into the insertion groove.

8. The built-in type supersonic spindle according to claim 7, wherein the contact part includes: a bar-shaped first contact part body; and a second contact part body extending in the direction of the support part from the first contact part,
   wherein the second contact part body increases in thickness in the central direction of the spindle case so as to be thicker than the first contact part body,
   wherein the side of the second contact part body in the direction of the support part gets in contact with the bent portion of the support part body, and
   wherein a protrusion part protrudes on the side of the second contact part body in the opposite direction of the support part to pressurize the outer wheel of the bearing.

9. An excitation method using the supersonic spindle described in claim 1, the excitation method comprising the steps of:
   vibrating the built-in spindle unit by the supersonic vibrator, so that the spindle and the bearing of the built-in spindle unit are vibrated at the same time;
   rotating the spindle by a driving part of the built-in spindle unit; and
   vibrating and rotating a machining tool disposed on the spindle at the same time, so that a workpiece is machined.

10. The excitation method according to claim 9, wherein the built-in spindle unit floats inside the housing by the magnetic levitation unit.

* * * * *